United States Patent [19]

Akao

[11] Patent Number: 5,414,032

[45] Date of Patent: * May 9, 1995

[54] RESIN COMPOSITION FOR A CORE FOR WEB MATERIAL

[75] Inventor: Mutsuo Akao, Kanagawa, Japan

[73] Assignee: Fuji Photo Film Co., Ltd., Kanagawa, Japan

[ * ] Notice: The portion of the term of this patent subsequent to Jul. 6, 2010 has been disclaimed.

[21] Appl. No.: 952,148

[22] Filed: Sep. 28, 1992

Related U.S. Application Data

[60] Continuation of Ser. No. 612,230, Nov. 13, 1990, abandoned, which is a division of Ser. No. 268,372, Nov. 7, 1988, Pat. No. 4,989,802.

[30] Foreign Application Priority Data

Nov. 6, 1987 [JP] Japan ................ 62-169097
Dec. 9, 1987 [JP] Japan ................ 62-309403

[51] Int. Cl.⁶ .............. C08K 5/49; C08K 5/16; C08K 5/13; C08K 3/34
[52] U.S. Cl. .................. 524/115; 524/127; 524/128; 524/186; 524/323; 524/261; 524/442; 525/240
[58] Field of Search .............. 525/240; 524/115, 127, 524/128, 186, 323, 261, 442

[56] References Cited

U.S. PATENT DOCUMENTS

| | | | |
|---|---|---|---|
| 4,046,737 | 9/1977 | Holt et al. | 260/45.8 |
| 4,147,291 | 4/1979 | Akao et al. | 229/55 |
| 4,258,848 | 3/1981 | Akao et al. | 260/524.2 |
| 4,331,725 | 5/1982 | Akao | 428/138 |
| 4,337,285 | 6/1982 | Akao et al. | 428/35 |
| 4,356,224 | 10/1982 | Akao et al. | 428/220 |
| 4,359,499 | 11/1982 | Akao et al. | 428/201 |
| 4,386,124 | 5/1983 | Akao | 428/35 |
| 4,411,943 | 10/1983 | Akao | 428/161 |
| 4,411,945 | 10/1983 | Akao | 428/216 |
| 4,436,809 | 3/1984 | Akao et al. | 430/501 |
| 4,452,846 | 6/1984 | Akao | 428/220 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/335 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 428/35 |
| 4,639,386 | 1/1987 | Akao | 428/35 |
| 4,653,640 | 3/1987 | Akao | 206/455 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |
| 4,708,896 | 11/1987 | Akao | 428/35 |
| 4,730,778 | 3/1988 | Akao et al. | 242/68.7 |

(List continued on next page.)

Primary Examiner—James J. Seidleck
Assistant Examiner—Mary Critharis
Attorney, Agent, or Firm—Burns, Doane, Swecker & Mathis

[57] ABSTRACT

A resin composition for forming a core for web material comprising 70 to 30 wt. % of polypropylene resin having a melt index of 10 to 60 g/10 minutes, a bending elastic modulus of more than 8,000 kg/cm², an Izod impact strength of more than 2 kg.cm/cm and a Rockwell hardness of more than 70 R, 30 to 70 wt. % of linear low density polyethylene resin having a melt index of 3 to 50 g/10 minutes, a density of 0.910 to 0.935 g/cm³, an Olsen rigidity of more than 1,500 kg/cm² and a Shore hardness of more than 40 D, more than 0.01 wt. % of a lubricant and more than 0.01 wt. % of an antioxidant.

The resin composition is a light weight and excellent in injection moldability, appearance, dropping strength, solvent resistance, transparency, processibility, wear resistance, dimensional accuracy, and little molding troubles such as sink marks, resin remaining at gate, stringiness, weld lines, twist and deformation, add nevertheless, it has a flexibility.

13 Claims, 4 Drawing Sheets

U.S. PATENT DOCUMENTS

| | | | |
|---|---|---|---|
| 4,778,712 | 10/1988 | Akao et al. | 428/213 |
| 4,778,713 | 10/1988 | Akao | 428/215 |
| 4,784,906 | 11/1988 | Akao | 206/395 |
| 4,787,506 | 11/1988 | Akao | 206/395 |
| 4,796,823 | 1/1989 | Akao et al. | 242/71.8 |
| 4,828,106 | 5/1989 | Akao et al. | 206/316.1 |
| 4,844,961 | 7/1989 | Akao | 428/36.92 |
| 4,871,613 | 10/1989 | Akao | 428/328 |
| 4,876,125 | 10/1989 | Akao | 428/35.2 |
| 4,876,129 | 10/1989 | Akao | 428/359 |
| 4,894,264 | 1/1990 | Akao | 428/34.2 |
| 4,903,834 | 2/1990 | Akao | 206/410 |
| 4,906,517 | 3/1990 | Akao | 428/216 |
| 4,925,711 | 5/1990 | Akao | 428/35.2 |
| 4,950,512 | 8/1990 | Akao | 428/35.8 |
| 4,960,626 | 10/1990 | Akao et al. | 428/36.92 |
| 4,977,033 | 12/1990 | Akao | 428/516 |
| 4,978,572 | 12/1990 | Akao | 428/323 |
| 5,110,639 | 5/1992 | Akao | 428/35.2 |
| 5,225,466 | 7/1993 | Akao | 524/108 |

RESIN COMPOSITION FOR A CORE FOR WEB MATERIAL

This application is a continuation of application Ser. No. 07/612,230, filed Nov. 13, 1990, now abandoned, which is a divisional of application Ser. No. 07/268,372, filed Nov. 7, 1988, now U.S. Pat. No. 4,989,802.

BACKGROUND OF THE INVENTION

1. Field of the Invention

This invention relates to a core for a photographic photosensitive web material including roll films and roll papers, such as the negative or positive films for movie, negative or positive microfilms, long 35 mm roll films (J 135), the films for phototype setting, the films for computer and the papers for computerized type-setting system, and a resin composition suitable for it.

2. Description of Prior Art

The above photographic photosensitive web materials such as the negative or positive films for movie is sold and used in a state coiled around a core. Most conventional cores for web material were made of thermoplastic resin, particularly high-impact polystyrene resin where synthetic rubber (mainly butadiene rubber) is blended or polymerized with polystyrene resin. The shape of a conventional core for web material is shown in FIGS. 6 and 7.

In the core for web material shown in the above drawings, an outer cylinder 1 and an inner cylinder 2 having almost the same length as the outer cylinder are disposed so that their axes are made consistent with each other. Both cylinders 1, 2 are joined by a ring plate 3 disposed perpendicular to the axis of the core at their centers and by eight pairs of ribs 4 disposed at the same position as each other through the ring plate 3. The ribs 4 have almost the same shape as the section of the circular channel formed by the cylinders 1, 2 and the ring plate 3, and they are disposed in radial directions of the cylinders 1, 2 at regular intervals. Resin-injecting gates are disposed at the center of the edges of the eight ribs 4 on one side, and the gate remainder 6 remain at the respective corresponding positions. Moreover, the inner cylinder 2 is provided with an engaging channel 8 for engaging a pawl or the like of the shaft of a moving picture camera or a moving picture projector in the axial direction, and the outer cylinder 1 is provided with a slit channel 7 for inserting an end of the film in the axial direction.

The inventor developed a core for web material where the gate portions are moved to the centers of respective sector portions of the ring plate 3 partitioned by the cylinders 1, 2 and the ribs 4, 4, as shown in FIG. 4, in order to improve compressive strength (Japanese Utility Model KOKAI No. 61-128256). Moreover, the inventor also developed another core for web material where the compressive strength is improved and the weight is decreased by cutting off the ribs 4 from each free end portion as shown in FIG. 3 (Japanese Utility Model KOKAI No. 61-86367).

Other known cores for web material include a core where the flanges are integrated (Japanese Utility Model KOKAI No. 49-18536) and a core where one of the flanges is made detachable and thereby the long film can be placed in the coiled state (Japanese Utility Model KOKOKU No. 59-24025).

In the conventional cores for web material such as mentioned above, all faces including the inner surface of the outer cylinder and the outer surface and the inner surface of the inner cylinder as well as the outer surface of the outer cylinder are made flat.

In such conventional cores, molded cores were liable to remain on the side of cavities. Since the cores remaining in the cavities could not be ejected by a stripper, they caused ejecting trouble. Moreover, weld line was strongly formed, and decreased compressive strength, dropping strength and the like.

Moreover, the cores made of the aforementioned resin were soluble in organic solvents, and the shape was liable to be damaged. Since the resin contained synthetic rubber, the core was inferior in transparency, that is easily it was expensive.

SUMMARY OF THE INVENTION

An object of the invention is to provide a core for web material that is easily ejectable from the cavity of an injection molding machine, and excellent in moldability.

Another object of the invention is to provide a core for web material wherein a weld line hardly occurs, and wherein appearance and strength are improved.

Another object of the invention is to provide a resin composition suitable for a core for web material, and excellent in dimensional accuracy, chemical resistance, physical strength including compressive strength, dropping strength and surface strength, and injection moldability by not generating a weld line.

The present invention has been made in order to achieve such objects and is based upon the findings that, when the contact area with the cavity was greater than with the mold core, the molded core was liable to remain on the side of the cavity due to the greater friction resistance with the cavity than with the mold core. Another finding is that the weld line occurred on the opposite side to the gate due to the delayed influx of the resin caused by its inferiority in fluidity.

In the core for web material of the invention, the above problems have been solved by providing one or more projections at a portion of the core for web material to be contacted with the mold core, and thereby ensuring the ejection of the molded core because the friction resistance between the molded core for web material and the mold core is greater than the friction resistance between the molded core and the mold cavity. Thus, the core for web material of the invention comprises a core made of a thermoplastic resin for web material molded by injection molding which comprises an outer cylinder, an inner cylinder disposed so that its axis is aligned with (the axes are coaxial) the axis of the outer cylinder, a ring plate joining both cylinders disposed around the center of both cylinders perpendicular to the above axis and plural ribs joining both cylinders disposed in the radial directions from the axis substantially symmetrical about the above ring plate. One or more projections are informed at least at a part of the portion of the core for web material to be contacted with the mold core at the time of injection molding.

The present invention also provides a resin composition which has achieved the above object suitable for the above core for web material, comprising 70 to 30 wt. % of polypropylene resin having a melt index of 10 to 60 g/10 minutes, a bending elastic modulus of more than 8,000 kg/cm$^2$, an Izod impact strength of more than 2 kg.cm/cm and a Rockwell hardness of more than 70 R, 30 to 70 wt. % of linear low density polyethylene resin having a melt index of 3 to 50 g/10 minutes, a density of 0.910 to 0.935 g/cm$^3$, an Olsen rigidity of more than 1,500 kg/cm$^2$ and a Shore hardness of more than 40 D, more than 0.01 wt. % of a lubricant and more than 0.01 wt. % of an antioxidant.

DETAILED DESCRIPTION OF THE INVENTION

Figure 1:
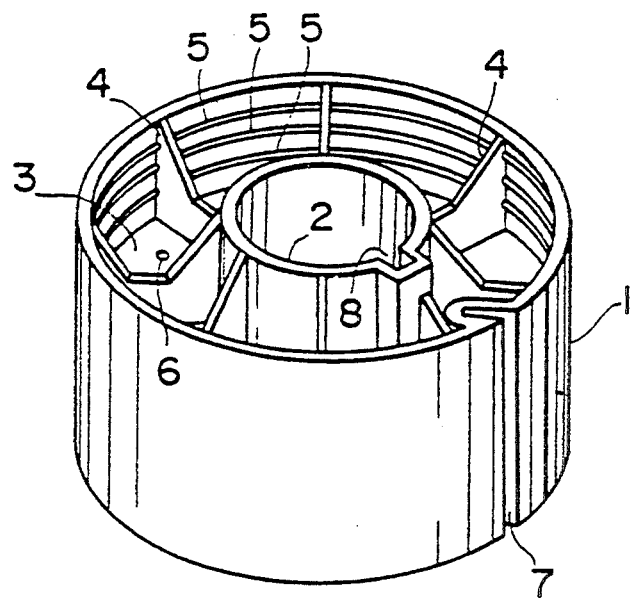
FIG. 1 is a perspective view of a core for web material embodying the invention.

The projection is formed for the purpose that the friction resistance between the core for web material and the mold core is made greater than the friction resistance between the core for web material and the cavity so that the molded core for web material does not remain in the cavity. Therefore, the size, shape, number and the like of the projection may be varied within the extent capable of achieving the above condition. However, the number is preferably more than one, and for example, the projection may be several lines formed in parallel, spots, stripes, or the like. The projection may be formed at least at a part of the portion to be contacted with the mold core, and for example, it may be formed at one or more parts of the inner surface of the outer cylinder, the inner and outer surfaces of the inner cylinder, and the ribs.

The outer cylinder is the portion on which is wound the web material, and when the outer surface is made rough, pressure marks or abrasion marks occur in the photographic photosensitive web material coiled around the core. Therefore, it is preferable that the outer surface of the outer cylinder is flat and smooth, or the irregularities on the outer surface be than several micrometers in height.

The inner cylinder is the portion to be inserted into the shaft of the apparatus which uses the web material.

The inner cylinder is disposed so that the axis is coaxial with the axis of the outer cylinder, and joined to the outer cylinder around the center of both cylinders through one piece of the ring plate disposed perpendicular to the above axis. As a result, the section of the joined portion becomes H-shape. The ring plate may be provided with windows and the like, for example, at the portions between respective ribs.

The plural ribs are disposed in the radial directions from the longitudinal axis and substantially symmetrically about the above ring plate, and they also join both cylinders. The symmetrical arrangement is preferable in the balance of resin flow. The shape of the ribs may be any known shape. All ribs need not necessary to be identical in shape, thickness and the like. The number of the ribs is decided according to the size, strength and the like of the core for web material, and it is usually 2 to 32 pieces.

The thickness of each portion may be uniform or partly thickened or thinned.

The ring plate is partitioned into sector portions by the ribs and both cylinders, and each resin-injecting gate portion is preferably disposed around the center of each sector portion on one side of the ring plate or around the center of the edge of each rib, because the treatment of the gate mark is not necessary. The number of the resin-injecting gates is, in general, made even in view of the balance of resin flow.

Various modifications may be added to the core for web material according to its use. In the case of a core for movie film, the modifications include a channel for engaging a pawl of the shaft of a moving picture projector, a slit channel for inserting an end of the film and flanges for holding the coiled film.

The shapes, the sizes, the thicknesses and the like of respective portions mentioned heretofore is decided according to the kind, length, size and required properties of the web material, and may be identical with any known core, other than the projection mentioned previously. Various indications such as company name, trade name, mold number and the like can be cut in the ring plate.

In the core for web material of the invention, the projection fits in the indentation of the mold forming the projection of the core, and thereby friction resistance is increased. As a result, the molded core for web material is ejected while attached to the mold core.

The material forming the core may be any thermoplastic resin. However, polypropylene resin, polystyrene resin, ABS resin and the like are preferable, and more preferable resin contains more than 50 wt. % of high-impact polystyrene resin excellent in dimensional accuracy, rare occurrence of bottom sink mark, great physical strength and inexpensiveness. The thermoplastic resin may contain various additives, such as lubricant, antistatic agent, light-shielding material, white pigment, color pigment, color dye, antioxidant, metal powder, higher fatty acid, metal salt of fatty acid and coupling agent.

However, the present invention provides a particularly suitable resin composition suitable for the core of web material, which comprises a particular polypropylene resin, a particular linear low density polyethylene (L-LDPE) resin, a lubricant and an antioxidant.

The melt index (MI, ASTM D-1238) of the polypropylene resin is 10 to 60 g/10 minutes, preferably 20 to 50 g/10 minutes, more preferably 30 to 40 g/10 minutes. When the MI is less than 10 g/10 minutes, the resin fluidity is worse. As a result, weld lines greatly occur, and dropping strength and compressive strength decrease. Besides, sink marks greatly occur, and appearance is inferior. When the resin is used for a core for photographic photosensitive web material, pressure marks ocur in rib portions. Moreover, injection moldability is inferior, and molding cycle is elongated. Even though the resin temperature is raised, short shot is liable to occur. Sink marks are great, and cooling time is elongated. While, when the MI is beyond 60 g/10 minutes, physical strength decreases. Surface hardness and rigidity are small, and burrs and stringiness are liable to occur.

The bending elastic modulus (ASTM D-790) of the polypropylene resin is more than 8,000 kg/cm$^2$, preferably more than 9,000 kg/cm$^2$, particularly preferably more than 10,000 kg/cm². When the bending elastic modulus is less than 8,000 kg/cm², the resin is soft. In the case of blending it with L-LDPE resin in order to improve Izod impact strength, compressive strength is insufficient.

The Izod impact strength (ASTM D-256, at 23° C.) of the polypropylene resin is more than 2 kg.cm/cm, preferably more than 3 kg.cm/cm, particularly preferably more than 4 kg.cm/cm. When the Izod impact strength is less than 2 kg.cm/cm, the blending amount of the L-LDPE resin must be increased in order to improve Izod impact strength. As a result, the resin remaining at gate and stringiness frequently occur, land weld lines greatly occur because the resin fluidity is worse.

The Rockwell hardness (ASTM D-785) of the polypropylene resin is more than 70 R, preferably more than 80 R, particularly preferably more than 90 R. When the Rockwell hardness is less than 70 R, the resin powder by abrasion and scratches occur in the channel for engaging the core with a pawl of a developing apparatus, a moving picture projector or a winder, the slit for inserting an end of a web material and the flanges for holding the coiled web material, and the trouble that the resin powder adheres to the web material occurs. Particularly, in photographic photosensitive roll films, such as film for movie and microfilm, and computerized type-setting paper, when the resin powder adheres to them, the merchandise values are lost.

The polypropylene resin having the properties mentioned above may be homopolypropylene resin or a copolymer resin of propylene and an α-olefin having a number of carbon atoms of 2 to 8, such as propylene-ethylene random copolymer or propylene-ethylene block copolymer. In view of preventing whitening, preferable polypropylene resin is propylene-ethylene random copolymer resin having a propylene unit of 90 to 99.5 wt. % and an ethylene unit of 10 to 0.5 wt. %, particularly a propylene unit of 93 to 99 wt. % an ethylene unit of 7 to 1 wt. %.

In the case of employing any type polypropylene resin, the molecular weight distribution ($\overline{Mw}$: weight average molecular weight/$\overline{Mn}$: number average molecular weight) measure by gel permeation chromatography is 1.5 to 8, preferably 2 to 6, more preferably 2.5 to 5 in view of the balance among the improvement in dimensional accuracy, the prevention of sink mark, the increase of rigidity, the security of strength, injection moldability and the like. When the mean molecular weight ratio is less than 1.5, polymerization ability is worse and injection moldability is inferior.

, The polypropylene resin preferably contains a nucleating agent in view of rigidity, wear resistance, injection moldability, such as the preventions in stringiness, resin remaining at gate and burrs, the improvement in mold separability, and the like. The nucleating agent may be an organic nucleating agent, an inorganic nucleating agent or a mixture thereof, and an organic nucleating agent is preferred.

Though the polymerization method of polypropylene resin is not restricted, the vapor phase polymerization method is preferable in view of little mean molecular weight distribution resulting a narrow molecular distribution, a good dimensional accuracy and little sink markes and inexpensiveness. Catalysts to form a stereoregular polypropylene resin are preferred in view of securing the necessary properties.

The content of the polypropylene resin is 70 to 30 wt. %. When the content is beyond 70 wt. %, the occurrence of sink marks, the decrease of physical strength and the increase of mold shrinkage are problems. While, when the content is less than 30 wt. %, rigidity, wear resistance and injection moldability are inferior.

The L-LDPE resin is blended in order to increase Izod impact strength sharply and to improve dimensional accuracy and sink marks. The MI of the L-LDPE resin (ASTM D-1238) is 3 to 50 g/10 minutes, preferably 5 to 30 g/10 minutes, particularly preferably 7 to 20 g/10 minutes. When the MI is less than 3 g/10 minutes, resin fluidity is inferior to result the occurrences of weld lines and short shot. While, when the MI is beyond 50 g/10 minutes, the resin composition is inferior in dropping strength, rigidity, stringiness, gate remainder wear resistance and ESCR (ASTM D-1693).

The density (ASTM D-1505) of the L-LDPE resin is 0.910 to 0.935 g/cm³, preferably 0.915 to 0.930 g/cm³, particularly preferably 0.917 to 0.928 g/cm³. When the density is less than 0.910 g/cm³, rigidity is insufficient. Wear resistance is inferior, and polymerization properties are inferior resulting expensive. While, when the density is beyond 0.935 g/cm³, dropping strength is inferior.

The Olsen rigidity (ASTM D-747) is more than 1,500 kg/cm², preferably more than 1,800 kg/cm², particularly preferably more than 2,100 kg/cm². When the Olsen rigidity is less than 1,500 kg/cm², compressive strength is insufficient. As a result, when the winding pressure is great by winding a long web material, the core deforms.

The Shore hardness (ASTM D-2240) is more than 40 D, preferably more than 45 D, particularly preferably more than 50 D. When the Shore hardness is less than 40 D, the problems occur similar to the case that the Rockwell hardness of the polypropylene resin is less than 70 R.

The molecular weight distribution of the L-LDPE resin is similar to the case of the polypropylene resin.

The L-LDPE resin is a copolymer of ethylene and α-olefin and it has a linear structure having short branches. The number of carbon atoms of the α-olefin is 3–13, preferably 4–8, more preferably 6–8, and the examples are butene-1, 4-methylpentene-1, hexene-1, heptene-1 and octene-1. Suitable ethylene content of L-LDPE is 85–99.5 mol. %, i.e. α-olefin content is 0.5–15 mol. %, and preferable ethylene content is 90–99.5 mol. %, i.e. α-olefin content is 0.5–10 mol. %. The density is usually in the range of 0.87–0.95 g/cm³, (ASTM D-1505). Such a L-LDPE resin is manufactured by solution method, slurry method, vapor phase method, or modified high pressure method. Examples of L-LDPE resin are "G-RESIN", (trade name, UCC), "DOWLEX" (trade name, Dow Chemical Co., Ltd.), "STAMILEX" (trade name, DSM), "SUCLEAR" (trade name, Dupont de Nemour, Canada), "MAR-LEX" (trade name, Phillips Co., Ltd), "ULTZEX" and "NEOZEX" (trade name, Mitsui Petroleum Chemical Industries Co., Ltd.) and "NISSEKI LINIREX" (trade name, Nippon Petrochemicals Co., Ltd.).

The lubricant is added in order to improve injection moldability, mold separability, resin fluidity and the like. The content of the lubricant is more than 0.01 wt. %, preferably 0.03 to 2 wt. %, particularly preferably 0.05 to 0.5 wt. %. When the content is less than 0.01 wt. %, the separability of the core from the mold. Static electricity is liable to generate, and the surface is liable to be damaged. However, when the content is too much, the injected amounts vary due to screw slip.

Plasticization ability is insufficient. Bleading out of the lubricant increases, and developing trouble occurs due to the adhesion of the lubricant to the photosensitive web material. When the resin composition is used for the package of photographic photosensitive materials, the maximum content not affecting the photosensitive materials adversely is 2 wt. %.

The lubricant includes:

Oleic acid amide lubricants; "ARMOSLIP-CP" (Lion akzo Co., Ltd.), "NEWTRON" and "NEWTRON E-18" (Nippon Fine Chemical Co., Ltd.), "AMIDE-0" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid-amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd. ), etc.

Bis fatty acid amide lubricants; "BISAMIDE" (Nippon Fine Chemical Co., Ltd.), "DIAMID-200 BIS" (Nippon Kasei Chemical Co., Ltd.), "ARMOWAX-EBS" (Lion Akzo Co., Ltd.), etc.

Silicone lubricants; Dimethylpolysiloxanes, etc. (Sinetsu Chemical Co., Ltd., Toray Silicone Co., Ltd.), etc.

Alkylamine lubricants; "ELECTROSTRIPPER TS-2" (Kao Corp.) etc.

Preferable lubricants include the fatty acid amide lubricants having a number of carbon atoms of 8 to 50, preferably 15 to 35. Two or more lubricants may be combined.

The antioxidant is added in order to prevent yellowing and coloring of the resin. The content of the antioxidant is more than 0.01 wt. %, preferably 0.03 to 1 wt. %, particularly preferably 0.05 to 0.5 wt. %. When the content is less than 0.01 wt. %, continuous injection for a long time is impossible, because the yellowing of the resin occurs. However, in the case of a core for photographic photosensitive web material, when the content is too much, troubles occur in the quality, such as fogging and sensitivity variation. The maximum content not affecting the photographic photosensitive materials adversely is 1 wt. %.

Suitable antioxidants are phenol antioxidants, sulfur-containing antioxidants, phosphorus-containing antioxidants and the like. The phenol antioxidants include n-octadecyl-3-(3',5'-di-t-butyl-4'-hydroxyphenyl)propionate, 2,6-di-t-butyl-4-methylphenol, 2,6-di-t-butyl-p-cresol (BHT), 2,2'-methylenebis(4-methyl-6-t-butylphenol), 4,4'-thiobis(3-methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene, octadecyl-3-(3,5-di-t-butyl-4-hydroxyphenyl) propionate and tetrakis methylene-3(3',5'-di-t-butyl-4'-hydroxyphenyl)propionate methane. The sulfur-containing antioxidants include dilauryl-3,3'-thiodipropionate, dimyristyl-3,3'-thiodipropionate, laurylstearylthiodipropionate, distearyl-3,3'-thiodipropionate and di-tridecyl-3,3'-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearyl-thiodipropionate, dialkylphoshpate, etc. Particularly preferable antioxidants are phenol antioxidants. Two or more antioxidants may be combined.

When carbon black is added. The antioxidation effect is synergistically exhibited.

The resin composition of the invention preferably further contains a nucleating agent in view of the improvements of rigidity, injection moldability, transparency, wear resistance and heat resistance, and the decrease of molding troubles such as stringiness, gate remainder and burrs.

The resin composition of the invention may contain other known additives. Representative other additives usable for the resin composition are illustrated as follows:

(1) Plasticizer; phthalic acid esters, glycol esters, fatty acid esters, phosphoric acid esters, etc.

(2) Stabilizer; lead compounds, cadmium compounds, zinc compounds, alkaline earth metal compounds, organic tin compounds, etc.

(3) Antistatic agent; cation surfactants, anion surfactants, nonion surfactants, ampholytic surfactants, etc.

(4) Flame retardant; phosphoric acid esters, phosphoric acid ester halides, halides, inorganic materials, polyols containing phosphor, etc.

(5) Filler; alumina, kaolin, clay, calcium carbonate, mica, talc, titanium oxide, silica, etc.

(6) Reinforcing agent; glass lobing, metallic fiber, glass fiber, glass milled fiber, carbon fiber, etc.

(7) Coloring agent; inorganic pigments (Al, $Fe_2O_3$, $TiO_2$, ZnO, Cds, etc.), organic pigments (carbon black) dyes, etc.

(8) Blowing agent; inorganic blowing agents (ammonium carbonate, sodium hydrogen carbonate), organic blowing agents (nitroso compounds, azo compounds), etc.

(9) Vulcanizing; vulcanization accelerator, acceleration assistant, etc.

(10) Deterioration preventing agent; ultraviolet absorber, antioxidant, metal deactivator, peroxide decomposing agent etc.

(11) Coupling agent; silane compounds, titanium compounds, chromium compounds, aluminum compounds, etc.

(12) Antiblocking agent; silica, diatomaceous earth, talc, silicate, aluminum silicate, magnesium silicate, calcium carbonate, higher fatty acid polyvinyl esters, n-octadecylurea, dicarboxiylic acid ester amide, N,N'-dioleyloxamide, etc.

(13) Various thermoplastic resins, rubbers, etc.

In addition, a chlorine absorbent, a light-shielding material and the like may also be blended.

The resin composition is a light weight and excellent in injection moldability, appearance, dropping strength, solvent resistance, transparency, precessibility, wear resistance, dimensional accuracy, and little molding troubles such as sink marks, gate remainder, stringiness, weld lines, twist and deformation, and nevertheless, it has a flexibility.

Though the use of the resin composition is not restricted, it is suitable for cores for various photographic photosensitive web materials, including the core for web material of the invention, such as for video tape, audio tape, movie film, film for phototype setting, film for computer, computerized type-setting paper and the like. The core is particularly suitable for the positive film for movie and positive microfilm.

The core for web material is molded by injection molding including intermold vacuum injection molding.

Flanges and other parts may be attached to the core for web material, and the core may be printed or labeled.

Since the ejection of the core for web material is improved, injection moldability is improved. The resin fluidity is improved, and thereby weld lines do not form. The appearance and the physical strength are also improved. By using the resin composition described herein, the processibility, appearance and physical strength are further improved, and injection molding cycle can be shortened.

EXAMPLES

Figure 2:
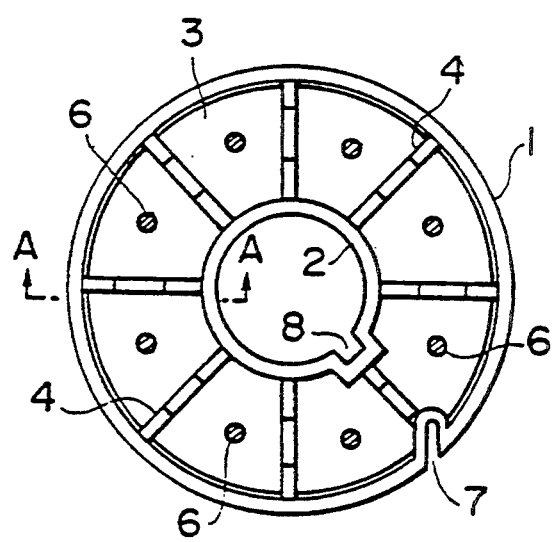
FIG. 2 is a front view thereof.
Figure 3:
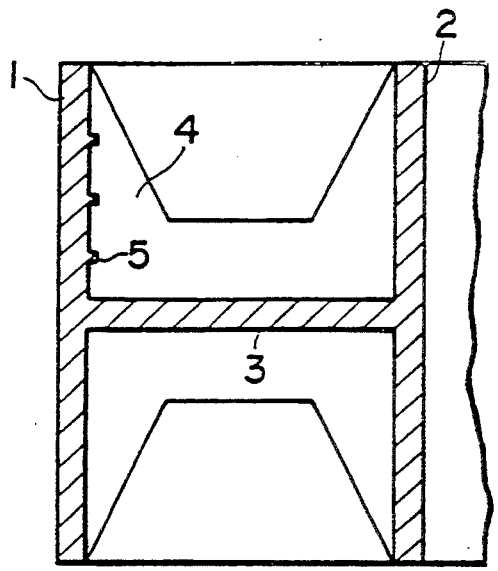
FIG. 3 is an enlarged sectional view taken on line 3—3 of FIG. 2.

A core for web material embodying the invention is shown in FIGS. 1 to 3.

As shown in the drawings, the core is formed of an outer cylinder 1, an inner cylinder 2, a ring plate 3 and eight pairs of ribs 4, 4, . . . 4. The length of the inner cylinder 2 is the same as the outer cylinder 1, and the inner cylinder 2 is disposed so that its axis is aligned with the axis of the outer cylinder 1. Thus, the inner and outer cylinders 1,2 are coaxial. The ring plate 3 is disposed perpendicular to the above common axis, and joins both cylinders 1, 2 at their center. The ribs 4 are all the same shape except one pair disposed at the slit 7 for inserting the film and the engaging channel 8. Except for the one aforementioned pair, the ribs 4 are of a rectangular shape having their free edge cut into a reverse trapezoidal shape through their full length. The pair of ribs 4 disposed adjacent the slit 7 and the channel 8 is shortened by the projections of the slit 7 and the engaging channel 8 that project toward the rib 4. Each pair of ribs 4 is disposed symmetrically about the ring plate 3 in the radial directions from the axis at regular intervals, and is joined to both cylinders 1, 2 and the ring plate 3. That is, the ring plate 3 is partitioned into eight sector portions. Resin-injecting gates (not illustrated) are disposed at the center of respective sector portions, and gate remainder 6 remains there. The inner cylinder 2 is provided with an engaging channel 8 for engaging a pawl of the shaft of a moving picture camera or a moving picture projector in the axial direction, and the outer cylinder 1 is provided with a slit channel 7 for inserting an end of the film in the axial direction. In such a core, the projection 5 for increasing the friction resistance to the mold core (not illustrated) is formed on the inner surface of the outer cylinder 1 on the opposite side to the resin-injecting gate portions. The projection 5 is composed of three ring lines disposed parallel with respect to each other at equal intervals in the circumferential direction of the outer cylinder 1.

Figure 4:
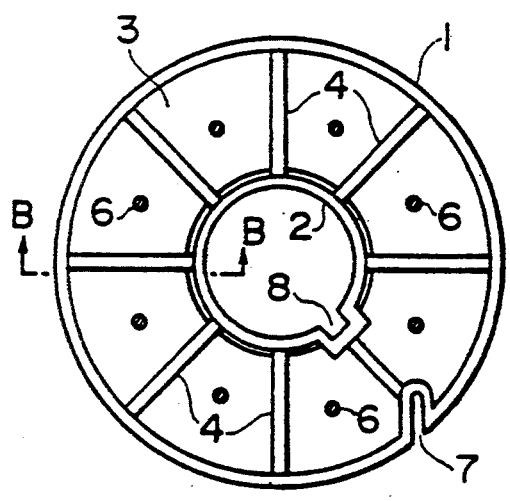
FIG. 4 is a front view of another core for web material embodying the invention.
Figure 5:
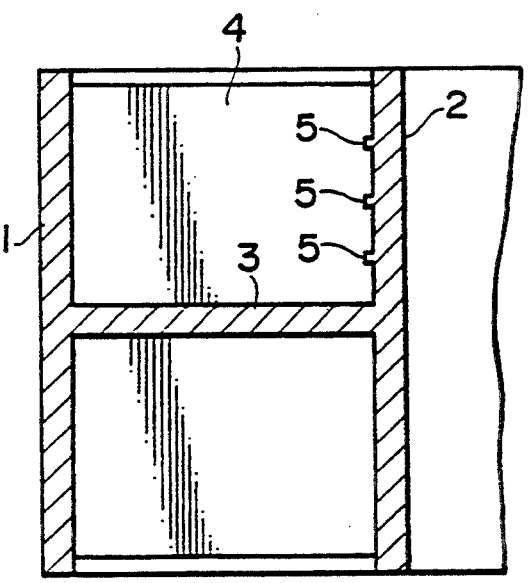
FIG. 5 is an enlarged sectional view taken on line 5—5 of FIG. 4.

Another core for web material embodying the invention is shown in FIGS. 4 and 5. The core is the same as the above core, except that each rib 4 is rectangularly shaped and the projection 5 comprised of three ring lines is formed on the outer surface of the inner cylinder 2 instead of the inner surface of the outer cylinder 1.

Subsequently, various properties of three examples of the core of the invention were measured together with a comparative core and a conventional core.

Core of the Invention I

The core of the invention I is the core for 35 mm movie film 2000 feet in length, and is made of a high-impact polystyrene resin ("Styron", Asahi Chemical Industries). It has a shape shown in FIGS. 1 to 3. The outside diameter of the outer cylinder is 76.2 mm, and the inside diameter of the inner cylinder 2 is 25.9 mm. The length of both cylinders 1, 2 is 34.5 mm. The size of each rib 4 is 15 mm in length×21 mm in width. The angle between the surface of each cylinder 1 or 2 and the oblique cut line of the rib 4 is 30 degrees, and the length of the cut part parallel with the ring plate 3 is 10 mm. The thickness of the outer cylinder 1 is 2.1 mm, the thickness of the inner cylinder 2 is 2.0 mm, the thickness of the ring plate is 2.2 mm, and the thickness of the rib 4 is 2.0 mm. The height of each ring line of the projection 5 is 0.3 mm, and the width is 0.5 mm. The distance between respective ring lines is 2.5 mm.

Core of the Invention II

The core of the invention II is the same as the core of the invention I, except that the ribs 4 are rectangular shaped as shown in FIG. 5 and have a size of 10 mm in length×21 mm in width.

Core of the Invention III

The core of the invention III is the same as the conventional core, except that the same projection 5 as the core of the invention I is formed.

Comparative Core I

The comparative core I is the same as the core of the invention II, except that the projection 5 is not formed.

Conventional Core I

Figure 6:
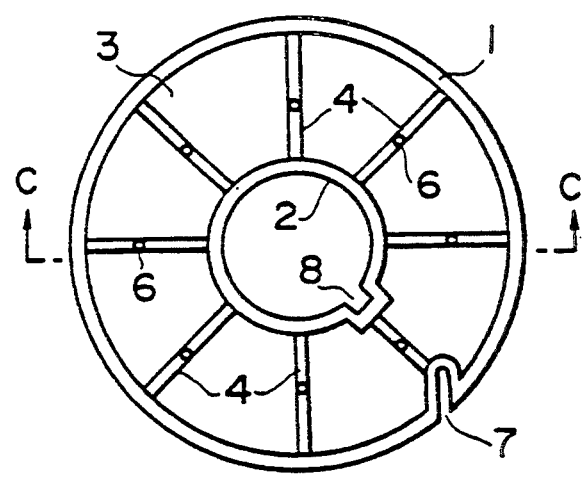
FIG. 6 is a front view of a conventional core for web material.
Figure 7:
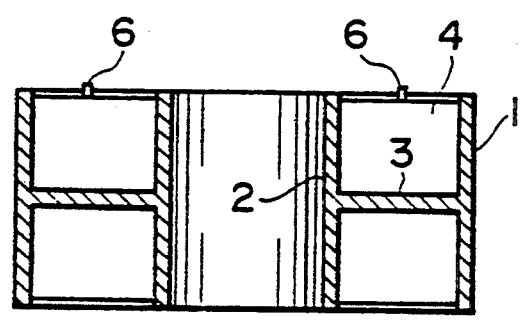
FIG. 7 is a sectional view taken on line 7—7 of FIG. 6.
Figure 8:
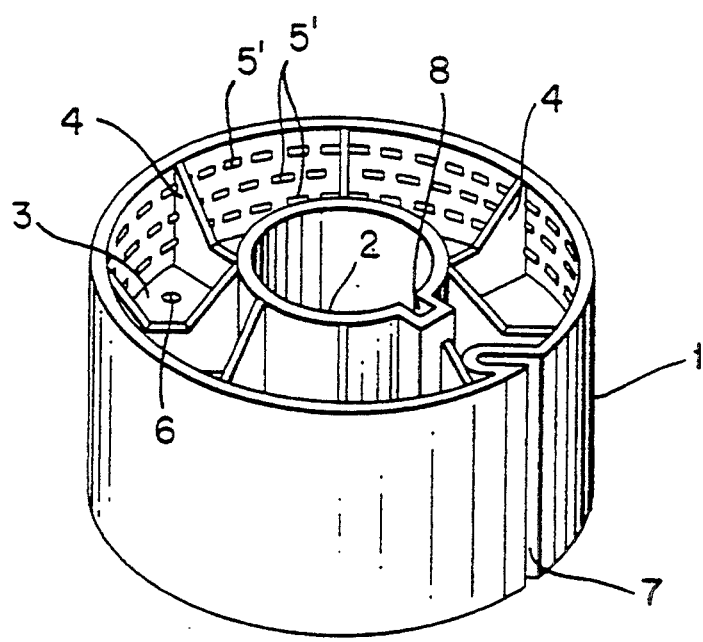
FIG. 8 is a perspective view of a core for web material according to another embodiment of the present invention.

The conventional core I has a shape shown in FIGS. 6 and 7, and the size of the rib 4 is 15 mm in length×21 mm in width.

The measured results are summized in Table 1.

TABLE 1

|  | Core of Invention | | | Comparative | Conventional |
|---|---|---|---|---|---|
|  | I | II | III | Core I | Core I |
| Front View | FIG. 2 | FIG. 4 | FIG. 6 | FIG. 4 | FIG. 6 |
| Rib shape | FIG. 3 | FIG. 5 | FIG. 7 | FIG. 5 | FIG. 7 |
| Weight (g) | 39 | 40.6 | 44.6 | 40 | 44 |
| Weld Line | A | A | B | B | C |
| Injection Moldability | A | A | A | C | C |
| Compressive Strength (kg) | 363 | 345 | 305 | 328 | 265 |
| Dropping Strength | A-B | A-B | A-B | B | B |
| Processing of Gate Remainder | Not Necessary | Not Necessary | Necessary | Necessary | Not Necessary |

Evaluations were carried out as follows:

A very excellent    B excellent

-continued

C practical

Weld Line: The generation degree of the weld lines in each core was evaluated by visual obsevation.
Injection Moldability: Evaluated by the separability of the molded product and the occurrence of molding troubles such as short shot and deformation such as warp and twist by organoleptics.
Compressive Strength: The maximum value obtained by measuring using a compression tester "Strograph R-Type" manufactured by Toyo Seiki Seisaku-Sho, Ltd.
Dropping Strength: Evaluated by the damaged state of the core coiled with a 35 mm width positive film for movie 2,000 feet in length dropped from 30 cm height by organoleptics.

Core of the Invention IV

The shape of the core of the invention IV is the same as the core of the invention I, except that the projection 5 is not formed. The resin composition of the core is composed of 50 wt. % of polypropylene resin which is propylene-ethylene random copolymer resin consisting of 96.5 wt. % of propylene unit and 3.5 wt. % of ethylene unit having a MI of 38 g/10 minutes, a bending elastic modulus of 11,000 kg/cm², an Izod impact strength of 4.3 kg.cm/cm and a Rockwell hardness of 90 R manufactured by vapor phase polymerization method, 49.7 wt. % of L-LDPE resin which is a copolymer resin of ethylene and 4-methylpentene-1 having a MI of 18 g/10 minutes, a density of 0.919 g/cm³, an Olsen rigidity of 2,200 kg/cm² and a Shore hardness of 50 D manufactured by solution polymerization method, 0.2 wt. % of BHT as the antioxidant and 0.1 wt. % of oleic acid amide as the lubricant. The core was molded by a common injection molding using an injection molding machine with a cold runner at a mold clamping pressure of 100 t. The molding number per once was one.

Core of the Invention V

The shape of the core of the invention V is the same as the core of the invention II except that the projection 5 is not formed, and the resin composition is the same as the core of the invention IV.

Core of the Invention VI

The shape of the core of the invention VI is the same as the conventional core I, and the resin composition is the same as the core of the invention IV.

Core of the Invention VII

The shape of the core of the invention VII is the same as the core of the invention II except that the projection 5 is formed on the inner surface of the outer cylinder 1 instead of the outer surface of the inner cylinder 2. The resin composition of the tore is composed of 54.4 wt. % of the same polypropylene resin as the core of the invention IV, 45 wt. % of L-LDPE resin which is a copolymer resin of ethylene and 4-methylpentene-1 having a MI of 10 g/10 minutes, a density of 0.925 g/cm³, an Olsen rigidity of 2,500 kg/cm² and a Shore hardness of 52 D manufactured by solution polymerization method, 0.2 wt. % of BHT as the antioxidant and 0.2 wt. % of 1,3,2,4-di(methylbenzilidene) sorbitol as the organic nucleating agent, 0.2 wt. % of oleic acid amide as the lubricant.

Core of the Invention VIII

The shape of the core of the invention VIII is the same as the core of the invention VII. The resin composition of the core is composed of 55 wt. % of the same polypropylene resin as the core of the invention IV, 44.5 wt. % of L-LDPE resin which is a copolymer resin of ethylene and 4-methylpentene-1 having a MI of 12 g/10 minutes, a density of 0.920 g/cm³, an Olsen rigidity of 2,500 kg/cm² and a Shore hardness of 50 D manufactured by solution polymerization method, 0.3 wt. % of BHT as the antioxidant, 0.1 wt % of a phosphor-containing antioxidant and 0.1 wt. % of oleic acid amide as the lubricant.

Comparative Core II

The shape of the comparative core II is the same as the core of the invention VI, and the core is composed of the same polypropylene resin as the core of the invention VI alone.

Comparative Core III

The shape of the comparative core III is the same as the core of the invention VI, and the core is composed of the same L-LDPE resin as the core of the invention VI alone.

Conventional Core II

The shape of the conventional core II is the same as the core of the invention VI, and the core is composed of the high-impact polystyrene resin ("Styron", manufactured by Asahi Chemical Industries) alone.

Various properties of the above cores, and the results are summarized in Table 2.

TABLE 2

|  | Core of Invention | | | | | Comparative Core | | Conventional |
|---|---|---|---|---|---|---|---|---|
|  | IV | V | VI | VII | VIII | II | III | Core II |
| Front View | FIG. 1 | ≈FIG. 4 | FIG. 6 | ≈FIG. 4 | ≈FIG. 4 | FIG. 6 | FIG. 6 | FIG. 6 |
| Rib Shape | FIG. 3 | FIG. 5 | FIG. 7 | FIG. 5 | FIG. 5 | FIG. 7 | FIG. 7 | FIG. 7 |
| Weight (g) | 32.7 | 32.7 | 35.8 | 32.6 | 32.7 | 32.3 | 33.1 | 44.6 |
| Cost Ratio | 62 | 62 | 67 | 62 | 62 | 61 | 66 | 100 |
| Necessity of Gate | No | No | Yes | No. | No | Yes | Yes | Yes |
| Remainder Trimming | A | A | C | A | A | C | E | C |
| Injection Moldability | A | A | A | A | A | A | E | C |
| Sink Mark | B | B | B | B | B | E | B | B |
| Weld Line | B | B | B | B | B | B | D-E | C |
| Transparency | B | B | B | B | B | A | C | E |
| Dropping Strength | A | A | A | A | B | E | A | D |
| Solvent Resistance | A | A | A | A | A | A | A | E |

TABLE 2-continued

|  | Core of Invention | | | | | Comparative Core | | Conventional |
| --- | --- | --- | --- | --- | --- | --- | --- | --- |
|  | IV | V | VI | VII | VIII | II | III | Core II |
| Wear Resistance | B | B | B | A | A | A | C | D |

Evaluations were carried out as follows:

| A: very excellent | B: excellent |
| --- | --- |
| C: practical | D: having a problem |
| E: impractical | |

Cost Ratio: The cost ratio of the resin to Conventional core II.

Necessity of Gate Remainder Trimming: "Yes" indicates that packaging work or developing work was interfered with the gate remainder when the core was used without trimming the gate remainder, and "No" indicates that the above works were not interfered.

Sink Mark: The sink marks in each core was evaluated by visual observation.

Solvent Resistance: Evaluated by immersing each core in alcohol and triol.

Wear Resistance: Evaluated by the Worn degree of each core after used for a long time in a developing apparatus.

I claim:

1. An injection. moldable resin composition consisting essentially of 70 to 30 wt. % of polypropylene resin having a molecular weight distribution of 1.5 to 8, a melt index of 10 to 60 g/10 minutes, a bending elastic modulus of more than 8,000 kg/cm$^2$, an Izod impact strength of more than 2 kg.cm/cm and a Rockwell hardness of more than 70 R, 30 to 70 wt. % of linear low density polyethylene resin having a molecular weight distribution of 1.5 to 8, a melt index of 3 to 50 g/10 minutes, a density of 0.910 to 0.935 g/cm$^3$, an Olsen rigidity of more than 1,500 kg/cm$^2$ and a Shore hardness of more than 40 D, 0.03 to 2 wt. % of a fatty acid amide lubricant having 15 to 35 carbon atoms and/or a silicone lubricant and 0.03 to 1 wt. % of a phenol and/or phosphorus containing antioxidant.

2. The resin composition of claim 1 wherein said polypropylene resin is a propylene-ethylene random copolymer.

3. The resin composition of claim 1 which further contains a nucleating agent.

4. The resin composition of claim 1 wherein the molecular weight distribution of the polypropylene resin is from 2 to 6.

5. The resin composition of claim 1 wherein the melt index of the polypropylene resin is from 20 to 50 g/10 minutes.

6. The resin composition of claim 1 wherein the bending elastic modulus of the polypropylene resin is more than 9,000 kg/cm$^2$.

7. The resin composition of claim 1 wherein the Izod impact strength of the polypropylene resin is more than 3 kg.cm/cm.

8. The resin composition of claim 1 wherein the Rockwell hardness of the polypropylene resin is more than 80 R.

9. The resin composition of claim 1 wherein the melt index of the linear low density polyethylene resin is from 5 to 30 g/10 minutes.

10. The resin composition of claim 1 wherein the Olsen rigidity of the linear low density polyethylene resin is more than 1,800 kg/cm$^2$.

11. The resin composition of claim 1 wherein the Shore hardness of the linear low density polyethylene resin is more than 45 D.

12. The resin composition of claim 1 wherein the density of the linear low density polyethylene is from 0.915 to 0.930 g/cm$^3$.

13. The resin composition of claim 1 wherein the linear low density polyethylene has an alpha-olefin content of from 0.5 to 10 mole %.

* * * * *